United States Patent
Nakatsugawa (10) Patent No.: US 7,751,006 B2
(45) Date of Patent: Jul. 6, 2010

(54) OPTICAL ELEMENT, LIQUID CRYSTAL DISPLAY DEVICE MEMBER WITH THE OPTICAL ELEMENT, LIQUID CRYSTAL DISPLAY DEVICE WITH THE LIQUID CRYSTAL DISPLAY DEVICE MEMBER, METHOD OF PRODUCING THE OPTICAL ELEMENT AND METHOD OF EVALUATING BIREFRINGENCE FUNCTIONAL LAYER

(75) Inventor: Yuji Nakatsugawa, Matsudo (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 205 days.

(21) Appl. No.: 11/902,625

(22) Filed: Sep. 24, 2007

(65) Prior Publication Data
US 2008/0079877 A1 Apr. 3, 2008

(30) Foreign Application Priority Data
Sep. 29, 2006 (JP) .............................. 2006-266892

(51) Int. Cl.
G02F 1/13363 (2006.01)
G02F 1/1339 (2006.01)

(52) U.S. Cl. .................. 349/118; 349/119; 349/117

(58) Field of Classification Search .................. None
See application file for complete search history.

(56) References Cited

U.S. PATENT DOCUMENTS

2005/0179003 A1 8/2005 Heckmeier et al.

2008/0043329 A1* 2/2008 Jagt et al. .................. 359/494

FOREIGN PATENT DOCUMENTS

JP A-2004-524385 8/2004
WO WO 02/44801 A2 6/2002

* cited by examiner

Primary Examiner—Sung H Pak
Assistant Examiner—Eric Wong
(74) Attorney, Agent, or Firm—Oliff & Berridge, PLC (57) ABSTRACT

The invention provides: an optical element that includes a birefringence functional layer constituted of a polymerizable liquid crystal material, in which the birefringence functional layer is formed directly or indirectly on a substrate, and in a post-process carried out thereafter, alignment and characteristics of the birefringence functional layer are not disturbed, with the result that a high quality birefringence control function can be exerted; a liquid crystal display device provided with the optical element; a method of evaluating a birefringence functional layer that is not disturbed in the alignment and physical properties by the post-process; and a method of producing the optical element. The optical element includes at least a light-transmitting substrate; and a birefringence functional layer made of a polymerizable liquid crystal material, wherein the birefringence functional layer is formed by aligning a polymerizable liquid crystal monomer having a polymerizable group at least at one terminal thereof directly or indirectly on a substrate followed by fixation, and a degree of reduction of residual double bonds in the birefringence functional layer before and after heat treatment at 250° C. for 1 hr is less than 0.25.

14 Claims, 1 Drawing Sheet

OPTICAL ELEMENT, LIQUID CRYSTAL DISPLAY DEVICE MEMBER WITH THE OPTICAL ELEMENT, LIQUID CRYSTAL DISPLAY DEVICE WITH THE LIQUID CRYSTAL DISPLAY DEVICE MEMBER, METHOD OF PRODUCING THE OPTICAL ELEMENT AND METHOD OF EVALUATING BIREFRINGENCE FUNCTIONAL LAYER

BACKGROUND OF THE INVENTION

1. Field of the Invention

The present invention relates to an optical element having a birefringence functional layer, and in more detail, to an optical element having a birefringence functional layer formed by aligning and fixing a polymerizing liquid crystal monomer. Furthermore, the invention relates to a liquid crystal display device member and a liquid crystal display device which are provided with the optical element, a method of producing the optical element, and a method of evaluating the birefringence functional layer.

2. Description of the Related Art

A liquid crystal display device, having various advantages such as being easy to make thin and light, able to reduce the consumption power and difficult to cause flickers, is used in various fields such as televisions and medical equipments. The liquid crystal display device switches light by making use of the birefringence property of a driving liquid crystal material. Accordingly, the liquid crystal display device has the viewing angle dependency derived from the birefringence property of the driving liquid crystal material. In addition to the above, the liquid crystal display device has a problem in that, depending on an angle by which a viewer sees a liquid crystal display screen, light leakage or gradation reversal phenomenon is caused, that is, the viewing angle becomes narrower.

In order to overcome the problem, developed is a birefringence functional layer forming film having a retardation control function that controls exit light from a liquid crystal cell or incident light to a liquid crystal cell. The birefringence functional layer forming film is usually prepared by stretching a film such as polyacrylate, polycarbonate or triacetyl cellulose. The film is located outside of a liquid crystal cell formed by sandwiching a driving liquid crystal material with two substrates. At that time, the birefringence functional layer forming film is usually adhered to a substrate with an adhesive to use. However, since the refractive index of the adhesive coated on the substrate is different from the refractive index of a birefringence functional layer forming film, there is a problem in that the irregular reflection is caused at a display surface. Furthermore, there is a problem in that, when the birefringence functional layer forming film is adhered outside of the substrate, the exposed film absorbs moisture to expand. Still furthermore, since a birefringence functional layer forming film cannot be patterned in accordance with a pixel size of a display and the heat resistance is low, there is a problem in that the optical characteristics vary owing to the shrinkage with time.

In order to overcome the problems, there are recently proposed a method of forming a birefringence functional layer having a retardation control function from a liquid crystal material such as a polymerizable liquid crystal or a polymer liquid crystal, and a method in which the birefringence functional layers are arranged inside of two substrates that sandwich a driving liquid crystal material for use as a so-called in-cell type (for example, Japanese Patent Application National Publication No. 2004-524385 (JP-A-2004-524385)). When a birefringence functional layer is formed with the polymerizable liquid crystal material, it is necessary that after the polymerizable liquid crystal material is coated on a predetermined substrate, desired alignment is promoted and the alignment is fixed. JP-A-2004-524385 discloses an invention of an alignment layer having a retardation control function, which is formed by homeotropically aligning a polymerizable liquid crystal material. When a three-dimensional polymer network is formed in the alignment layer, as a method of increasing the crosslinking density of the polymer disclosed is a method where a non-mesogenic compound having at least two polymerizable functional groups is added to a polymerizable material.

A birefringence functional layer used as the in-cell type is excellent in that it can overcome problems possessed by the birefringence functional layer forming film of a type that is adhered outside of a substrate.

Usually, the birefringence functional layer, when formed in an optical element, excellently shows a desired alignment. However, when a different layer is further laminated on the optical element to form a liquid crystal device member, there is a problem in that the alignment of a polymerizable liquid crystal material that constitutes a birefringence functional layer is disturbed or the characteristics of the birefringence functional layer are disturbed. This results in another problem in that an optical element having such a birefringence functional layer cannot exhibit a high quality retardation control function.

SUMMARY OF THE INVENTION

The present invention has been achieved in view of the problems and enables to excellently maintain an alignment and characteristics of a birefringence functional layer of an optical element without being adversely affected by a process of forming another layer, which is carried out after the birefringence functional layer is formed.

The invention pays attention to an amount of residual double bonds in a polymerizable liquid crystal material that constitutes a birefringence functional layer. In more detail, the invention is based on the following finding. When using a birefringence functional layer whose degree of reduction of amounts of residual double bonds, which are obtained before and after a predetermined heat treatment, is less than 0.25, the alignment and the characteristics after the formation of the birefringence functional layer can be excellently maintained without being adversely affected by a process of forming another layer, which is carried out after forming the birefringence functional layer.

More specifically, the subject matters of the present invention are as follows.

(1) An optical element, comprising at least:
a light-transmitting substrate; and
a birefringence functional layer made of a polymerizable liquid crystal material,
wherein the birefringence functional layer is formed by aligning a polymerizable liquid crystal monomer having a polymerizable group at least at one terminal followed by fixation, and a degree of reduction of residual double bonds in the birefringence functional layer before and after heat treatment at 250° C. for 1 hr is less than 0.25.

(2) The optical element as recited in the item (1), wherein the birefringence functional layer is formed by forming a coating film by coating a birefringence functional layer composition solution containing a polymerizable liquid crystal monomer directly or indirectly on a top surface of the substrate, and then aligning the polymerizable liquid crystal monomer in a desired direction, followed by irradiating a top surface of the coating film with light to cause a polymerization reaction between the polymerizable liquid crystal monomers.

(3) The optical element as recited in the item (2), wherein the birefringence functional layer is formed by polymerizing and fixing the polymerizable liquid crystal monomers in a homeotropically aligned state.

(4) The optical element as recited in the item (1), wherein a coloring layer is formed between the substrate and the birefringence functional layer, or directly or indirectly on a top surface of the birefringence functional layer.

(5) The optical element as recited in the item (2), wherein a coloring layer is formed between the substrate and the birefringence functional layer, or directly or indirectly on a top surface of the birefringence functional layer.

(6) The optical element as recited in the item (1), wherein a coloring layer and a birefringence functional layer are formed on the substrate in this order, and an alignment film for aligning a driving liquid crystal material is directly or indirectly formed further on a top surface of the birefringence functional layer.

(7) The optical element as recited in the item (2), wherein a coloring layer and a birefringence functional layer are formed on the substrate in this order, and an alignment film for aligning a driving liquid crystal material is directly or indirectly formed further on a top surface of the birefringence functional layer.

(8) A liquid crystal display device member, comprising a liquid crystal layer in which a driving liquid crystal material is encapsulated between two laminate structures provided with a light-transmitting substrate,
wherein the optical element of the item (1) is used as one of the two laminate structures.

(9) A liquid crystal display device member, comprising a liquid crystal layer in which a driving liquid crystal material is encapsulated between two laminate structures provided with a light-transmitting substrate,
wherein the optical element of the item (2) is used as one of the two laminate structures.

(10) A liquid crystal display device member, comprising a liquid crystal layer in which a driving liquid crystal material is encapsulated between two laminate structures provided with a light-transmitting substrate,
wherein the optical element of the item (4) is used as one of the two laminate structures.

(11) A liquid crystal display device member, comprising a liquid crystal layer in which a driving liquid crystal material is encapsulated between two laminate structures provided with a light-transmitting substrate,
wherein the optical element of the item (6) is used as one of the two laminate structures.

(12) The liquid crystal display device member as recited in the item (8), wherein a birefringence functional layer in the optical element is located on a liquid crystal layer side in the liquid crystal display device member.

(13) A multi-layer liquid crystal display device, comprising:
a polarization plate outside of both substrates that sandwich the liquid crystal layer; and
a layer composed of an electrode member that applies a voltage to vary alignment of a liquid crystal layer,
wherein the liquid crystal display device member of the item (8) is used.

(14) A multi-layer liquid crystal display device, comprising:
a polarization plate outside of both substrates that sandwich the liquid crystal layer; and
a layer composed of an electrode member that applies a voltage to vary alignment of a liquid crystal layer,
wherein the liquid crystal display device member of the item (10) is used.

(15) A multi-layer liquid crystal display device, comprising:
a polarization plate outside of both substrates that sandwich the liquid crystal layer; and
a layer composed of an electrode member that applies a voltage to vary alignment of a liquid crystal layer,
wherein the liquid crystal display device member of the item (11) is used.

(16) A method of evaluating a birefringence functional layer, comprising:
measuring an amount of residual double bonds of a birefringence functional layer in the optical element of the item (1);
applying heat treatment at 250° C. for 1 hr, followed by leaving until the optical element comes to room temperature;
measuring an amount of residual double bonds of the heat-treated birefringence functional layer; and
calculating a difference between the amounts of the residual double bonds before and after the heat treatment to obtain a degree of reduction of residual double bonds.

(17) A method of evaluating a birefringence functional layer, comprising:
measuring an amount of residual double bonds of a birefringence functional layer in the optical element of the item (2);
applying heat treatment at 250° C. for 1 hr, followed by leaving until the optical element comes to room temperature;
measuring an amount of residual double bonds of the heat-treated birefringence functional layer; and
calculating a difference between the amounts of the residual double bonds before and after the heat treatment to obtain a degree of reduction of residual double bonds.

(18) A method of evaluating a birefringence functional layer, comprising:
measuring an amount of residual double bonds of a birefringence functional layer in the optical element of the item (4);
applying heat treatment at 250° C. for 1 hr, followed by leaving until the optical element comes to room temperature;
measuring an amount of residual double bonds of the heat-treated birefringence functional layer; and
calculating a difference between the amounts of the residual double bonds before and after the heat treatment to obtain a degree of reduction of residual double bonds.

(19) A method of producing an optical element that includes at least a light-transmitting substrate and a birefringence functional layer made of a polymerizable liquid crystal material, the method comprising:
aligning a polymerizable liquid crystal monomer having a polymerizable group at least at one terminal thereof directly or indirectly on the substrate followed by fixation to form the birefringence functional layer, thereby forming an optical element; and
measuring an amount of residual double bonds of the birefringence functional layer, and then applying heat treatment at 250° C. for 1 hr and leaving until the optical element comes to room temperature, followed by measuring an amount of residual double bonds of the heat-treated birefringence functional layer, and calculating a difference between the amounts of residual double bonds before and after the heat treatment to select one of which difference of amounts of residual double bonds is less than 0.25.

(20) The method of producing an optical element as recited in the item (19), wherein, after a birefringence functional layer composition solution containing a polymerizable liquid crystal monomer is coated directly or indirectly on a substrate to form a coating film and the polymerizable liquid crystal monomer is aligned in a desired direction, a top surface of the coating film is irradiated with light to cause a polymerization reaction between the polymerizable liquid crystal monomers to form the birefringence functional layer.

(21) The method of producing an optical element as recited in the item (19), wherein a coloring layer is formed between the substrate and the birefringence functional layer, or directly or indirectly on a top surface of the birefringence functional layer.

The term "birefringence functional layer" means a layer that has a retardation control function capable of optically compensating for a change in an optical phase difference (retardation).

The term "homeotropic alignment" means an alignment state where an optical axis of a polymerizable liquid crystal material constituting a birefringence functional layer rises up vertically or substantially vertically to a substrate surface. Furthermore, the phrase "a birefringence functional layer is homeotropically aligned" means that a polymerizable liquid crystal material that constitutes a birefringence functional layer is homeotropically aligned. In the invention, an ideal homeotropic alignment of a polymerizable liquid crystal material means a case where when, with a thickness direction of a birefringence functional layer set to a Z axis, a xyz orthogonal coordinate is assumed, a refractive index nx in an x-axis direction and a refractive index ny in a y-axis direction become substantially same and a retardation value when a measurement angle is 0° is 4 nm or less. The retardation value is preferably 3.5 nm or less and more preferably 3 nm or less.

The term "double bond" means a carbon-carbon double bond that contributes to polymerization in a polymerizable group located at a terminal of a polymerizable liquid crystal monomer.

The term "polymerizable liquid crystal material" means a polymerizable liquid crystal monomer, either one of an oligomer or polymer constituted of a polymerizable liquid crystal monomer, a combination thereof or all thereof. In particular, the term "polymerizable liquid crystal monomer" means only a polymerizable liquid crystal material that is a monomer.

According to the optical element of the invention, even when, in a process of forming another layer, which is carried out after a birefringence functional layer is formed (hereinafter, simply referred to as "post-process"), a birefringence functional layer is exposed to a solvent or heated to a high temperature, the alignment of a polymerizable liquid crystal material constituting the birefringence functional layer is hardly disturbed and the characteristics of the birefringence functional layer is hardly disturbed. Accordingly, even when, for example, a colorant layer or a polyimide alignment film that helps a driving liquid crystal material align is directly formed on a top surface of a birefringence functional layer formed in the optical element of the invention, the alignment or the characteristics of the birefringence functional layer are not disturbed owing to the forming process. The post-process includes a process of forming an arbitrary layer constituting a liquid crystal display device member provided with the optical element of the invention.

Furthermore, a birefringence functional layer in the invention is constituted of a polymerizable liquid crystal material to be arranged inside of an optical element. For this reason, different from an existing birefringence functional layer forming film that is adhered and arranged on an external surface of a substrate, the heat resistance is high, and as the result, the birefringence is hardly thermally affected. Accordingly, the optical element of the invention can be preferably used in an optical device that is used under an environment likely to be relatively high in temperature like in a car. Furthermore, the optical element of the invention, being relatively high in the heat resistance, can be arranged as well inside of a liquid crystal panel provided to an optical device. In particular, according to the invention where the polymerizable liquid crystal material has a birefringence functional layer having a crosslinking structure, the above-mentioned advantages can be more dominantly obtained.

In particular, the optical element of the invention, where a polymerizable liquid crystal monomer that constitutes the birefringence functional layer is fixed after homeotropically aligning, enables to provide an optical element, that exerts a birefringence function appropriate in an in plane switching mode (IPS mode) among various kinds of display modes of a liquid crystal display.

Furthermore, in the liquid crystal display device member of the invention, an optical element can be laminated and formed integrally with a member constituting a liquid crystal panel. Accordingly, an optical device can be designed without separately providing a member such as a film material that controls the retardation like the birefringence functional layer forming film. When the member is separately provided, it is necessary to use an adhesive to adhere to a substrate as mentioned above. On the other hand, according to the liquid crystal display device member provided with the optical element of the invention, such an adhesive is not required, with the result of reducing fear of light scattering due to the adhesive.

Accordingly, a liquid crystal display device member of the invention, which is provided with the optical element, and a liquid crystal display device provided with the member can provide a high quality retardation control function.

DESCRIPTION OF THE PREFERRED EMBODIMENTS

An optical element of the invention is provided with a birefringence functional layer. The birefringence functional layer is formed in such a manner that a polymerizable liquid crystal monomer having a polymerizable group at a terminal thereof is coated directly or indirectly on a light-transmitting substrate, promoted to cause a desired alignment and fixed in an aligned state. As for the optical element of the invention, after the formation of the birefringence functional layer, amounts of residual double bonds of the polymerizable liquid crystal material constituting the birefringence functional layer are measured before and after heat treatment at 250° C. for 1 hr. A degree of change of the residual amounts is less than 0.25. In what follows, best modes for carrying out the invention will be described in detail. The term "base material" means a substrate itself or a substrate having another layer formed thereon.

(Optical Element)

Figure 1:
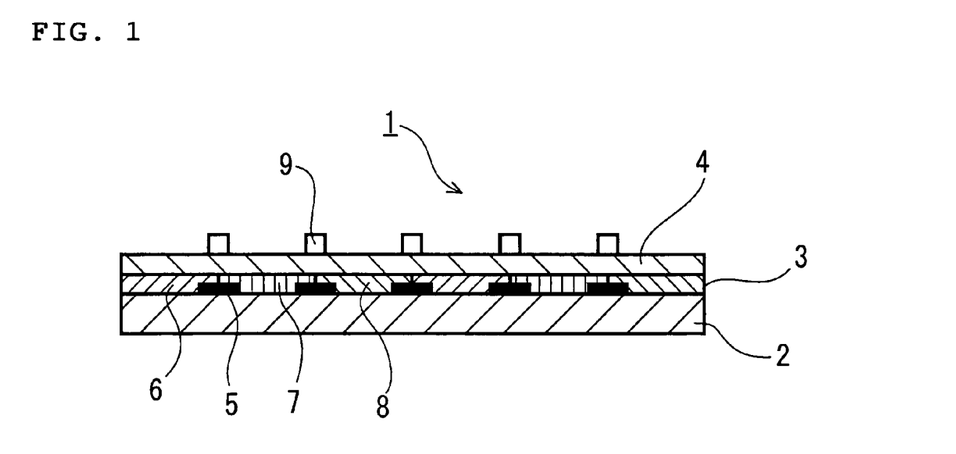
FIG. 1 is a schematic longitudinal sectional view for explaining one embodiment of an optical element of the invention.

FIG. 1 shows one embodiment of an optical element according to the invention.

The optical element 1 is constituted as follows. First, on a surface of a substrate 2 formed are a black matrix 5 (BM) and a coloring layer 3 including a red sub-pixel 6, a green sub-pixel 7 and a blue sub-pixel 8. Then, a birefringence functional layer 4 is laminated on a surface of the coloring layer 3, and further a plurality of spacers 9 arranged at arbitrary intervals on a top surface of the birefringence functional layer 4.

(Substrate)

The substrate 2 is preferred to have the light transmitting properties and be transparent and optically isotropic. However, as needs arise, it may locally have a region with optical anisotropy or a region with light shielding properties. Further, the light transmittance can be appropriately selected corresponding to applications of a liquid crystal display device member.

A glass substrate, a film or the like can be optionally used as the substrate. In the case of a liquid crystal display, alkali-free glass is preferably used as the substrate. Usable examples of the film include a uni-axially or bi-axially stretched film, and a TAC film having no retardation in plane.

As the substrate 2 specifically usable are inorganic materials such as glass, silicon or quartz, and organic materials (organic base materials). Examples of the organic base materials include ones made of acrylic resins such as polymethylmethacrylate, polyamide, polyacetal, polybuthylene terephthalate, polyethylene terephthalate, polyethylene naphthalate, triacetyl cellulose, or syndiotactic polystyrene, polyphenylene sulfide, polyether ketone, polyether ether ketone, fluorine-contained resin, or polyether nitrile, polycarbonate, modified polyphenylene ether, polycyclo hexene, or polynorbornene resin, or polysulfone, polyether sulfone, polypropylene, polyarylate, polyamide imide, polyether imide, polyether ketone or thermoplastic polyimide. The substrate may be made of general-purpose plastics. The substrate 2 has a thickness in the range of, for example, 5 µm to 3 mm, depending on applications.

(Coloring Layer)

The optical element 1 of the invention, which has the coloring layer 3 formed on the substrate 2, can be used as a member having a retardation control function and simultaneously can be used as a color filter for liquid crystal display device. In this case, in comparison with a case when a separate member including a coloring layer is laminated on an optical element, an entire thickness of the layer can be suppressed small, and accordingly, a liquid crystal display device can be thinned.

The black matrix (hereinafter, simply referred to also as "BM") 5 is formed so that regions corresponding to positions where the respective sub-pixels (colored sub-pixels) 6, 7 and 8 are arranged on the substrate 2 plane may be two-dimensionally partitioned into individual colored sub-pixels 6, 7 and 8.

The BM 5 can be formed when a metal thin film having the light-shielding property or light-absorbing property, such as a metal chromium thin film or a tungsten thin film, is patterned in a predetermined shape on the substrate 2 plane. Alternatively, there is an exemplary method where a resin BM composition solution is coated on a substrate surface by means of a spin coating method etc., the substrate is pre-baked at a temperature condition of about 90° C. for several minutes, then to expose a predetermined pattern, followed by developing with a KOH aqueous solution, and finally post-baking under conditions of 200° C. for about 60 min to form the BM 5. Furthermore, the BM 5 may be formed by printing an organic material such as a black resin into a predetermined pattern.

The red sub-pixel 6, green sub-pixel 7 and blue sub-pixel 8 that constitute the coloring layer 3 can be formed in such a manner that each of red, green and blue colorant is dispersed in a solvent to obtain a colorant dispersion solution, and a coating film of the colorant dispersion solution is patterned into a predetermined shape by means of, for example, a photolithography method. Specifically, the following method can be exemplified. On a top surface of the BM 5 (when the BM is not arranged, on a top surface of another base material such as a glass substrate or a birefringence functional layer), a red, green or blue pigment dispersion photo-resist is coated by a spin coating method. The BM 5 (or base material) is pre-baked at a temperature condition of about 80° C. for several minutes, and alignment exposed with a predetermined colored pattern photomask to perform development with a KOH aqueous solution or the like, followed by post-baking under the conditions of 200° C. for about 60 min to form the respective sub-pixels.

As still another method, a colorant dispersion solution in which a colorant corresponding to each of colors of the colored sub-pixels is dispersed is coated in a predetermined pattern and patterned. As a patterning mode of coating of the colorant dispersion solution, various patterns such as a stripe type, mosaic type and triangular type can be appropriately selected.

In the invention, the BM 5 is unnecessary in some cases depending on applications or optical specifications of the optical element 1. When the BM 5 is formed, a pattern of the BM 5 can be formed, other than into a rectangular lattice, into stripe or triangle as well.

As to a color pattern that constitutes a coloring layer 3 as well, not only three colors of the RGB system but also a CMY system that is a complementary color system thereof can be used as well. Furthermore, a single color pattern, a two-color pattern or a pattern of four or more colors can be used.

(Birefringence Functional Layer)

The birefringence functional layer 4 can be formed in such a manner that a birefringence functional layer composition solution containing at least a polymerizable liquid crystal monomer is directly coated on a top surface of the coloring layer 3 that is a base material plane, the polymerizable liquid crystal monomers are aligned in a predetermined direction and the polymerizable liquid crystal monomers are polymerized with each other. Hereinbelow, more detailed description will be given.

(Polymerizable Liquid Crystal Monomer)

Examples of the polymerizable liquid crystal monomer that is used in the birefringence functional layer composition solution include a crosslinkable nematic liquid crystal material (crosslinking nematic liquid crystal material). Examples of the crosslinking nematic liquid crystal material include a monomer having at least one polymerizable group such as a (meth) acryloyl group, an epoxy group, an oxetane group or an isocynate group in one molecule. Specific examples of the polymerizable liquid crystal material include one kind of compounds represented by formula (1) shown by [Chem 1] below or a mixture of at least two kinds thereof, one kind of compounds represented by formula (2) shown by [Chem 2] below or a mixture of at least two kinds thereof, one kind of compounds represented by [Chem 3] and [Chem 4] below or a mixture of at least two kinds thereof, and a mixture of them.

(1)

-continued

In the formula (1) shown in [Chem 1], $R^1$ and $R^2$ each denote hydrogen or a methyl group. In order to make a temperature range where a polymerizable liquid crystal monomer shows a liquid crystal phase broader, preferably at least one of $R^1$ and $R^2$ is hydrogen, and more preferably both of $R^1$ and $R^2$ are hydrogen. X in the formula (1) and Y in the formula (2) may be any one of hydrogen, chlorine, bromine, iodine, an alkyl group having 1 to 4 carbon atoms, a methoxy group, a cyano group or a nitro group and are preferably chlorine or a methyl group. "a" and b each showing a chain length of an alkylene group between a (meth) acryloyloxy group and an aromatic ring at both terminals of a molecular chain of the formula (1), and d and e in the formula (2) may be individually and independently an arbitrary integer in the range of 2 to 12, preferably in the range of 4 to 10, and more preferably in the range of 6 to 9. The formula (1) where a=b=0 or the formula (2) where d=e=0 is less stable, likely to be hydrolyzed and high in the crystallinity. Further, the formula (1) or (2) where "a" and b or d and e, respectively, are 13 or more is low in the isotropic phase transition temperature (TI). For this reason, in all of the compounds, a temperature range where the liquid crystal properties are stably exhibited (a temperature range where a liquid crystal phase can be maintained) becomes narrower, resulting in being unfavorable to use in the birefringence functional layer composition solution.

Owing to achievement of such birefringence, a birefringence functional layer composition solution is coated by use of a general coating device and liquid crystal monomers in the composition solution are aligned to thereby form a birefringence functional layer that can obtain desired phase control such as λ/4 or λ/2 when visible light having a wavelength of λ is transmitted.

An amount of retardation and the alignment characteristics, which show the characteristics of a birefringence functional layer, are determined by the birefringence Δn of a polymerizable liquid crystal monomer and a film thickness of a birefringence functional layer. When, for example, an optical element having a birefringence functional layer in which polymerizable liquid crystal monomers are homeotropically aligned, that is, a so-called positive C-plate is formed, Δn of the polymerizable liquid crystal monomer is preferably in the range of about 0.03 to 0.20 and more preferably in the range of about 0.05 to 0.15.

When a birefringence functional layer is formed from the birefringence functional layer composition solution, a blending component other than the polymerizable liquid crystal monomer in the composition solution is desirably added so as to be less than 30% by weight based on a total amount of blending components. When a blending component other than the polymerizable liquid crystal monomer is added 30% by weight or more based on a total amount of blending components, the alignment property of the polymerizable liquid crystal monomers may be deteriorated. However, this does not exclude from the invention that, when a so-called negative C-plate is formed with a birefringence functional layer composition solution constituted by adding a chiral agent described below, blending components other than the polymerizable liquid crystal monomers are added 30% by weight or more based on a total amount of blending components and an addition amount of the polymerizable liquid crystal monomers becomes less than 70% by weight. The addition amounts based on a total amount of blending components, when the birefringence functional layer composition solution is a mixture, mean weight ratios of the respective blending components, assuming that a total weight of the respective blended materials blended as materials constituting the mixture is 100. When the birefringence functional layer composition solution is a solution obtained by dissolving or mixing the blending components in a solvent, the addition amounts based on a total amount of blending components mean weight ratios of the respective blended materials, assuming that a weight obtained by subtracting a weight of a solvent from a weight of a solution (that is, a total amount of the respective blended materials before dissolving or suspending in a solvent) is 100. The addition amount based on a total amount of blending components described below is same as above.

(Solvent used in Birefringence Functional Layer Composition Solution)

The birefringence functional layer is formed by coating the polymerizable liquid crystal monomer on a transparent substrate or further on a top surface of a base material such as a coloring layer formed on the substrate. Accordingly, in order to make easy to coat a polymerizable liquid crystal monomer on a surface of a base material, it is preferable to prepare a birefringence functional layer composition solution containing at least the polymerizable liquid crystal monomer to coat the composition solution on a top surface of the base material.

Specifically, available examples of the solvent include at least one kind of hydrocarbons such as benzene, toluene, xylene, n-butyl benzene, diethyl benzene and tetralin; ethers such as methoxybenzene, 1,2-dimethoxybenzene and diethylene glycol dimethyl ether; ketones such as acetone, methyl ethyl ketone, methyl isobutyl ketone, cyclohexanone and 2,4-pentanedione; esters such as ethyl acetate, ethylene glycol monomethyl ether acetate, propylene glycol monomethyl ether acetate, propylene glycol monoethyl ether acetate and γ-butylolactone; amide solvents such as 2-pyrolidone, N-methyl-2-pyrolidone, dimethyl formamide and dimethyl acetamide; halogen-based solvents such as chloroform, dichloromethane, carbon tetrachloride, dichloroethane, tetrachloroethane, trichloroethylene, tetrachloroethylene, chlorobenzene and orthodichlorobenzene; alcohols such as t-butyl alcohol, diacetone alcohol, glycerin, monoacetin, ethylene glycol, triethylene glycol, hexylene glycol, ethylene glycol monomethyl ether, ethyl cellosolve and butyl cellosolve; and phenols such as phenol and parachlorophenol. With only one kind of solvent, the solubility of the blending components such as the polymerizable liquid crystal monomer may be insufficient or a material on which the solution is coated may be likely to be damaged. In such cases, at least two kinds of solvents are mixed and used, whereby the inconveniences can be avoided. Among the solvents, a hydrocarbon-based solvent and a glycol monoether acetate-based solvent are preferably used as a single solvent, and a mixed solvent of ethers or ketones and glycols is preferably used as a mixture solvent. A concentration of blending component of the birefringence functional layer composition solution is usually in the range of 1 to 60% by weight and preferably in the range of 3 to 40% by weight though different depending on, for example, the solubility of the blending components used in the birefringence functional layer composition solution to a solvent and a layer thickness desired for the birefringence functional layer.

(Polymerization Initiator)

Usually, a polymerization initiator such as a photopolymerization initiator is blended in a birefringence functional layer composition solution. As the photopolymerization initiator, a radical polymerization initiator is available. The radical polymerization initiator is a compound that generates a free radical owing to energy of UV light. Examples of the radical polymerization initiators include benzophenone derivatives such as benzoin and benzophenone or derivatives of esters thereof; xanthone and thioxanthone derivatives; halogen-containing compounds such as chlorosulfonyl, chloromethyl polynuclear aromatic compounds, chloromethyl heterocyclic compounds and chloromethyl benzophenones; triazines; fluorenones; haloalkanes; redox couples of a photo-reducing dye and a reducing agent; organic sulfur compounds; and peroxides. Examples of the photopolymerization initiators include ketone-based and biimidazole-based compounds such as Irgacure 184, Irgacure 369, Irgacure 651 and Irgacure 907 (trade name, produced by Ciba Specialty Chemicals), Darocure (trade name, produced by Merck Co., Ltd.), Adeka 1717 (trade name, produced by ADEKA CORPORATION.), and 2,2'-bis(o-chlorophenyl)-4,5,4'-tetraphenyl-1,2'-biimidazol (produced by Kurogane Kasei K. K.). The polymerization initiators can be used singularly or in a combination of at least two kinds thereof. When these are used in a combination of at least two kinds thereof, the polymerization initiators different in absorption wavelength are preferably combined and used so as not to disturb the absorption spectral characteristics.

The polymerization initiator is necessarily added within a range that does not adversely affect on the alignment performance of the polymerizable liquid crystal monomer in the birefringence functional layer composition solution. The polymerization initiator is usually added so as to be, based on a total amount of blended materials, in the range of 0.01 to 15% by weight, preferably in the range of 0.1 to 12% by weight, and more preferably in the range of 0.5 to 10% by weight.

In some cases, a polymerization inhibitor is added to a birefringence functional layer composition solution. Addition of the polymerization inhibitor makes it possible to improve the storage stability of the birefringence functional layer composition solution. Other than the photopolymerization initiator, a sensitizer and a surfactant can be appropriately added to a birefringence functional layer composition solution within a range that does not disturb the object of the invention.

(Alignment of Polymerizable Liquid Crystal Monomer)

The birefringence functional layer composition solution is directly coated on a base material and polymerizable liquid crystal monomers contained in the birefringence functional layer composition solution are polymerized to thereby form a birefringence functional layer having a birefringence control function. A coating surface side of the base material may be a substrate surface having light-transmitting properties or another constituent layer, for example, a coloring layer surface, or an alignment film surface. At least a birefringence functional layer is formed on a light-transmitting substrate, or at least a coloring layer and a birefringence functional layer are formed in this order or in an inverse order thereof, whereby an optical element of the invention is formed. An optical element having the coloring layer can be used to realize colorization in a liquid crystal display device and can be used as an optical element that exerts a birefringence control function. The description above does not exclude that, in a liquid crystal display device member of the invention provided with the optical element, layers other than the substrate, birefringence functional layer and coloring layer are further laminated.

When, with a birefringence functional layer composition solution, polymerizable liquid crystal monomers contained in the birefringence functional layer composition solution are homeotropically aligned and fixed, a so-called positive C-plate can be formed. The positive C-plate is configured such that optical axes of liquid crystal molecules are directed in a normal line direction of the birefringence functional layer, and has the extraordinary refractive index larger than the ordinary refractive index in a normal line direction of the birefringence functional layer. In such a case, when a known vertical alignment film is arranged in advance on a base material surface, polymerizable liquid crystal monomers in the composition can be aligned vertically. In order to more stabilize and secure a vertical alignment state of the polymerizable liquid crystal monomers, a vertical alignment aid may be further blended with a birefringence functional layer composition solution in a combination with the vertical alignment film, or singularly.

When polymerizable liquid crystal monomers are homeotropically aligned, the vertical alignment aid proves effective in more stabilizing and securing an alignment state of the polymerizable liquid crystal monomers. Specific examples of the vertical alignment aid include a surface coupling agent having vertically arranged alkyl chains or fluorocarbon chains, including lecithin or a quaternary ammonium surfactant such as HTAB (hexadecyltrimethylammonium bromide), DMOAP (N,N-dimethyl-N-octadecyl-3-aminopropyl trimethoxysilyl chloride) or N-perfluorooctylsulfonyl-3-aminopropyltrimethyl ammonium iodide, a silane polymer and a long chain alkyl alcohol.

The vertical alignment aid is blended so as to be in the range of 0.1 to 10% by weight and preferably in the range of 0.5 to 5% by weight based on a total amount of blending components. A particularly preferable blending amount of the vertical alignment aid is in the range of 0.8 to 2% by weight based on a total amount of blending components. When the content of the vertical alignment aid is less than 0.1% by weight, in some cases, the vertical alignment aid does not sufficiently contribute to impart the homeotropic aligning property to the polymerizable liquid crystal monomers contained in the birefringence functional layer composition solution. When the content of the vertical alignment aid exceeds 10% by weight, on the other hand, the alignment property of the polymerizable liquid crystal monomers in the birefringence functional layer composition solution is rather disturbed. As a consequence, there is fear that, when the polymerizable liquid crystal monomers are cross-linked and polymerized each other to cure the birefringence functional layer composition solution, the curing speed is lowered and the crosslinking density is lowered.

Furthermore, a birefringence functional layer formed from the birefringence functional layer composition solution can be formed as a so-called positive A-plate, in which optical axes of the polymerizable liquid crystal monomers are disposed in parallel with a birefringence functional layer and which has the extraordinary refractive index larger than the ordinary refractive index in an in-plane direction of the birefringence functional layer. In such a case, when an alignment restricting force due to a horizontal alignment film subjected to rubbing process etc. is applied on the polymerizable liquid crystal monomers or a leveling agent for controlling a surface free energy of the polymerizable liquid crystal monomers to an air interface is added to the birefringence functional layer composition solution, the polymerizable liquid crystal monomers contained in the composition solution can be aligned level.

Still furthermore, with the birefringence functional layer composition solution, a so-called negative C-plate can be formed, on which optical axes of the polymerizable liquid crystal monomers are disposed in parallel with a birefringence functional layer and which has the extraordinary refractive index smaller than the ordinary refractive index in a normal line direction of the birefringence functional layer. The negative C-plate means a birefringence functional layer configured such that the cholesteric regularity is imparted to the polymerizable liquid crystal monomers contained in the birefringence functional layer composition solution to thereby realize a chiral nematic liquid crystal. Specifically, similarly to the positive A-plate, the polymerizable liquid crystal monomers have only to be aligned level, followed by adding a known chiral agent. The chiral agent used in the invention does not necessarily have the cross-link ability in particular. However, a chiral agent having the cross-link ability is preferably used in view of the thermal stability of the obtained birefringence functional layer, and the like. Polymerization of the chiral agent having the cross-linkability and the polymerizable liquid crystal monomers contained in the birefringence functional layer composition solution enables to fix a state where the cholesteric regularity is imparted to the polymerizable liquid crystal monomers. In particular, ones having polymerizing functional groups at both terminals of its molecular structure are preferred from the viewpoint of improving the heat resistance of the birefringence functional layer.

The chiral agent is preferred to be a low molecular weight compound having an optically active site in a molecule and a molecular weight of 1500 or less. Further, the chiral agent preferably has the compatibility in a solution state or a melt state with a compound shown by the formula of [Chem 1], a compound shown by the formula of [Chem 2], or compounds shown by the formulas of [Chem 3] and [Chem 4] and can induce a spiral pitch without damaging the liquid crystal properties of a cross-linking nematic liquid crystal material.

Examples of the chiral agents usable in the invention include compounds having at least one asymmetric carbon, compounds having an asymmetric point on a hetero-atom such as chiral amine and chiral sulfoxide, and compounds having the axial asymmetry such as cumulene and binaphthol. Depending on the property of a selected chiral agent, the nematic regularity may be destroyed and the aligning property may be deteriorated. In particular, in the case of a non-polymerizable chiral agent, the curability due to the polymerization of the polymerizable liquid crystal monomers is deteriorated in some cases. In addition thereto, the electrical reliability of the birefringence functional layer formed with the birefringence functional layer composition solution may be deteriorated. Furthermore, the use of a large amount of a chiral agent having an optically active site causes a cost increase. Accordingly, as the chiral agent used in the invention, preferably selected is a chiral agent having a large effect in inducing a spiral pitch in aligning polymerizable liquid crystal monomers at a small quantity thereof. In particular, preferable is use of a low molecular weight compound having an axial asymmetry in a molecule. More specific examples of the chiral agent include a commercially available one such as S-811 (trade name, produced by Merck Co., Ltd.).

An optimum range of a blending amount of a chiral agent can be appropriately determined in consideration of spiral pitch induction capability or an extent of the cholesteric regularity of the polymerizable liquid crystal monomers contained in a birefringence functional layer, which is intended to finally obtain. A blending amount of the chiral agent in the birefringence functional layer composition solution, though different largely depending on the kinds of the polymerizable liquid crystal monomers, is generally in the range of 0.01 to 30% by weight, preferably in the range of 0.1 to 20% by weight, more preferably in the range of 0.5 to 15% by weight and particularly preferably in the range of 1 to 15% by weight, based on a total amount of blended materials. When the blending amount of the chiral agent is less than 0.01% by weight, in some cases, the cholesteric regularity cannot be sufficiently imparted to the polymerizable liquid crystal monomers contained in the birefringence functional layer composition solution. When the blending amount of the chiral agent exceeds 30% by weight, on the other hand, the alignment performance of the polymerizable liquid crystal monomers in the birefringence functional layer composition solution is disturbed. As a consequence, there is fear that, when the polymerizable liquid crystal monomers are crosslinked each other to cure the birefringence functional layer composition solution, the curing speed is lowered and the crosslinking density is lowered.

The birefringence functional layer composition solution may be prepared by mixing the respective constituent components such as the polymerizable liquid crystal monomers or by appropriately suspending or dissolving the respective constituent components such as the polymerizable liquid crystal monomers in a solvent. When the respective components are dissolved in a solvent, the birefringence functional layer composition solution is excellent in the coating property to a base material surface. In this case, the solvent is not particularly restricted as far as it can dissolve the blending components such as the polymerizable liquid crystal monomers and does not disturb the characteristics of a counterpart material to be coated thereon.

The birefringence functional layer 4 is formed as follows with the birefringence functional layer composition solution.

(Method of Coating Birefringence Functional Layer Composition Solution)

In the beginning, the birefringence functional layer composition solution is coated on the surface of the coloring layer 3 to form a liquid crystal coating film. The birefringence functional layer composition solution may be coated by appropriately using various kinds of printing methods such as a gravure printing method, an offset printing method, a relief printing method, a screen printing method, a transferring printing method, an electrostatic printing method and a plateless printing method; various kinds of coating methods such as a gravure coating method, a roll coating method, a knife coating method, an air knife coating method, a bar coating method, a dip coating method, a kiss coating method, a spray coating method, a die coating method, a comma coating method, an ink jet coating method, a spin coating method and a slit coating method, or combinations thereof.

At the time of forming the liquid crystal coating film, it is preferable to apply in advance a process of illuminating UV-ray (UV cleaning treatment) or corona discharge (corona treatment) to the surface of the coloring layer 3, because the wettability of the coloring layer 3 is improved to thereby bring the coloring layer 3 and the liquid crystal coating film into more intimate contact.

After a liquid crystal coating film is formed on the coloring layer 3, desired alignment property is imparted to the polymerizable liquid crystal monomers contained in the liquid crystal coating film to crosslinking polymerize the polymerizable liquid crystal monomers.

For example, when forming a birefringence functional layer 4 having a function as a positive C-plate, the polymerizable liquid crystal monomers in the liquid crystal coating film are homeotropically aligned, followed by polymerizing the polymerizable liquid crystal monomers each other. In order to impart the homeotropic alignment to the polymerizable liquid crystal monomers, the liquid crystal coating film is heated by use of, for example, means for heating with IR ray to a temperature where the polymerizable liquid crystal monomers contained in the liquid crystal coating film become a liquid crystal phase (liquid crystal phase transition temperature) or more and less than a temperature where the polymerizable liquid crystal monomers become an isotropic phase (liquid phase) (isotropic phase transition temperature).

Furthermore, polymerization (crosslinking polymerization) of the polymerizable liquid crystal monomers provided with the alignment in the liquid crystal coating film can be advanced in such a manner that light having photosensitive wavelengths of a polymerizable liquid crystal material and a photopolymerization initiator contained in the birefringence functional layer composition solution is illuminated on the surface of the liquid crystal coating film. At this time, a wavelength of light illuminated on the liquid crystal coating film can be appropriately selected in accordance with an absorption wavelength of a birefringence functional layer composition solution and is generally in the range of substantially 200 to 500 nm. Light that is illuminated on the liquid crystal coating film, without restricting to monochromatic light, may be light having a definite wavelength range including a photosensitive wavelength of the photopolymerization initiator.

The birefringence functional layer composition solution is coated and heated to remove a solvent. By making use of heat at this time, the polymerizable liquid crystal monomers in the birefringence functional layer composition solution can be aligned in a definite direction. Though different depending on differences of the respective materials contained in the birefringence functional layer composition solution, a heating temperature is usually in the range of 70 to 120° C. and a heating time is substantially in the range of 2 to 30 min. For example, when the homeotropic alignment is imparted to the polymerizable liquid crystal monomers during solvent removal, the liquid crystal coating film is heated by use of, for example, means for heating with IR ray to a temperature where the polymerizable liquid crystal monomers contained in the liquid crystal coating film become a liquid crystal phase (liquid crystal phase transition temperature) or more and less than a temperature where the polymerizable liquid crystal monomers become an isotropic phase (liquid phase) (isotropic phase transition temperature).

As another method of vaporizing a solvent in a birefringence functional layer composition solution and simultaneously homeotropically aligning polymerizable liquid crystal monomers contained in the birefringence functional layer composition solution, reduced-pressure drying may be applied at pressure of about $1.5 \times 10^{-1}$ Torr or less in a closed vessel. In the reduced-pressure drying, when the liquid crystal coating film is placed under reduced pressure, the liquid crystal coating film can be super cooled, which enables to align homeotropically the polymerizable liquid crystal monomers contained in the liquid crystal coating film. Next, with a homeotropically aligned state kept, a temperature of a base material having the liquid crystal coating film is rendered to substantially room temperature. Thereby, a homeotropically aligned state of the polymerizable liquid crystal monomers can be efficiently maintained until the polymerizable liquid crystal monomers are crosslinked at a post-process. Further, in order to remove a residual solvent and to secure the alignment of the polymerizable liquid crystal monomers contained in the coloring film, a base material having the liquid crystal coating film may be baked. The baking method is not particularly restricted. For example, a base material having a liquid crystal coating film is disposed on a hot plate and baked at a temperature in the range of 70 to 120° C. for 2 to 30 min.

Then, light having photosensitive wavelengths of the polymerizable liquid crystal monomer and the photopolymerization initiator contained in the birefringence functional layer composition solution is illuminated on the liquid crystal coating film. This makes it possible to advance the polymerization (crosslinking polymerization) between polymerizable liquid crystal monomers aligned in a desired direction in the liquid crystal coating film. At that time, the wavelength of the light to be illuminated on the liquid crystal coating film is appropriately selected in accordance with the kind of the polymerizable liquid crystal monomers contained in the birefringence functional layer composition solution and the kind of a photopolymerization initiator added thereto. The light to be illuminated on the liquid crystal coating film, without restricting to monochromatic light, may be light having a wavelength range including a photosensitive wavelength of the birefringence functional layer composition solution. More specifically, light is appropriately selected in accordance with an absorption wavelength of the photopolymerization initiator contained in the birefringence functional layer composition solution. For example, the polymerizable liquid crystal monomers can be cured in a state where active radiation such as UV-ray is illuminated to crosslinking polymerize the polymerizable liquid crystal monomers. UV-ray having a wavelength in the range of substantially 200 to 500 nm is illuminated. As a UV-ray source available is a high-pressure mercury lamp, a xenon lamp or a metal halide lamp. Though it depends on the kind and composition of the polymerizable liquid crystal monomers and the kind and amount of the photopolymerization initiator, an amount of light illuminated is usually in the range of about 10 to 3000 mJ/cm$^2$. After illumination of UV ray, the heat treatment is further applied to crosslinking polymerize unreacted polymerizable liquid crystal monomers that could not be cured by the photopolymerization in a state of being aligned in a desired direction to form the birefringence functional layer 3. A temperature and a time at the heat treatment after illumination of UV ray are, though dependent on the kind and composition of the polymerizable liquid crystal monomers, usually under the conditions of 150 to 260° C. for about 10 to 60 min. A thickness of the birefringence functional layer 3 obtained by crosslinking polymerizing the coated birefringence functional layer composition solution followed by curing is not particularly restricted as far as a desired retardation control can be applied. Usually, the thickness is preferably in the range of about 0.5 to 10 μm from the viewpoint of the productivity.

Thus, when the polymerizable liquid crystal monomers contained in the liquid crystal coating film are crosslinking polymerized, the liquid crystal coating film forms a birefringence functional layer 4 to thereby prepare an optical element 1.

As for the optical element 1 shown in FIG. 1, the invention has been described with a mode where the birefringence functional layer 4 is formed on the top surface of the coloring layer 3. However, the mode does not restrict the optical element of the invention. For example, first, a birefringence functional layer may be formed on a top surface of a substrate, and further on a top surface of the birefringence functional layer, a coloring layer may be disposed.

When the birefringence functional layer 4 is formed from a liquid crystal coating film, light may be illuminated on the liquid crystal coating film to advance a crosslinking polymerization reaction of the polymerizable liquid crystal monomers, and furthermore the liquid crystal coating film may be baked with an oven or the like. The baking allows the birefringence functional layer 4 to be cured more, thereby obtaining an optical element 1 where the birefringence functional layer 4 is sufficiently cured.

(Alignment Film)

Prior to coating a birefringence functional layer composition solution directly or indirectly on a transparent substrate to form a birefringence functional layer, an alignment film may be disposed on a surface of a base material on which the birefringence functional layer composition solution is to be coated. Though not shown in the drawing, for example, an alignment film may be formed on the top surface of the coloring layer 3 in FIG. 1. The alignment film is differentiated from an alignment film for aligning a driving liquid crystal material.

The alignment film is, though not necessarily required, preferred to be arranged from the viewpoint that arranging an alignment film makes it easy to control an alignment direction of the polymerizable liquid crystal monomers present in the liquid crystal coating film. The alignment film can be formed in such a manner that an aligning resin such as polyimide is coated on a surface of a base material on which a birefringence functional layer composition solution is to be coated, and the base material is dried, followed by rubbing or photo-aligning. However, the rubbing or the photo-aligning is not necessarily applied. Also, when silicon oxide is obliquely deposited on the transparent substrate 2, an alignment film can be formed. Commercially available alignment film materials can be used as the alignment film material used in the invention. Specific example of the commercially available alignment film materials include an alignment film material (trade name: Sunever, produced by Nissan Chemical Industries Ltd.), an alignment film material (trade name: QL, LX series, produced by HD Microsystems Ltd.), an alignment film material (trade name: AL series, produced by JSR Co., Ltd.) and an alignment agent (trade name: Lixon Aligner, produced by Chisso Corporation).

The birefringence functional layer composition solution is coated on a base material to form a birefringence functional layer, whereby an optical element can be formed. The optical element, when assembled in a liquid crystal display device, can be used as an optical element that can exert a retardation control function for controlling a viewing angle.

Furthermore, by use of the birefringence functional layer composition solution, a birefringence functional layer can be directly formed on a base material surface that constitutes a liquid crystal display device. For example, a birefringence functional layer can be arranged to a liquid crystal display device member that constitutes a liquid crystal display device. Like this as well, a birefringence functional layer can exert the retardation control function for controlling a viewing angle in a liquid crystal display device.

(Spacer)

The spacer 9 can be formed in the following manner. A photo-curable photosensitive coating composition made of a material such as an acrylic polymer, amide polymer or ester polymer, which contains multi-functional acrylate, is coated on a top surface of a layer that is destined to face a driving liquid crystal layer (the birefringence functional layer 4 in FIG. 1) and dried, followed by exposing through a mask pattern corresponding to a position where the spacer 9 is destined to be formed to cure a resin in the coating composition. Further, an uncured portion is removed by etching, followed by baking an entirety.

In the optical element of the invention, the spacer 9 is not an indispensable structure. An optical element according to another mode where the spacer 9 is omitted can be realized as well. Furthermore, the spacer 9 can be formed not only on the top surface of a birefringence functional layer 4 shown in FIG. 1 but also, in an optical element where a substrate, a birefringence functional layer and a coloring layer are laminated in this order, on a top surface of the coloring layer, or on a top surface of a layer (for example, protective layer) further laminated on the top surface of the birefringence functional layer 4.

The protective layer can be formed by coating on a surface of a base material a transparent resin material made of a material such as an acrylic polymer, amide polymer or esteric polymer, which contains multi-functional acrylate, or a transparent resin material made of a material such as an acrylic polymer, amide polymer or ester polymer, which contains multi-functional epoxy, and then drying the base material, followed by curing. The protective layer may be cured by, for example, illuminating UV ray in accordance with properties of the transparent resin material.

(Method of Forming Polyimide Alignment Film)

An alignment film for aligning a driving liquid crystal material in a desired direction may be further formed on the top surface of the birefringence functional layer 4 of the optical element 1. Examples of the alignment film include a polyimide alignment film.

The polyimide alignment film can be formed as follows. An alignment film composition solution obtained by dissolving polyimide in a γ-butylolactone solvent is coated on a top surface of a base material such as a birefringence functional layer by means of a spin coating method or the like to form a polyimide coating film. Then, grooves for directing alignment of a driving liquid crystal material adjacent thereto is formed by rubbing a surface of the polyimide coating film or the like. Finally, heat treatment at 250° C. for about 1 hr is applied to vaporize the solvent.

(Degree of Reduction of Residual Double Bonds)

In the optical element of the invention thus formed, the degree of reduction of residual double bonds of the birefringence functional layer in the optical element is particularly important to be less than 0.25.

The inventor studied in detail a problem that alignment or characteristics of a birefringence functional layer after the birefringence functional layer was formed could not be excellently maintained. As the result, it has been found that after the birefringence functional layer is formed, the alignment or the characteristics of the birefringence functional layer are disturbed owing to influence of processes (post-processes) of forming other layers. It has been also found that there are two main processes below as the post-processes that disturb the alignment or the characteristics of the birefringence functional layer.

A first one of the post-processes that disturb the alignment or the characteristics of the birefringence functional layer is, for example, influence of a process employing a solvent (solvent treatment process). Specifically, it has been confirmed that, for example, after a step of forming a polyimide alignment film for promoting aligning a driving liquid crystal material on a top surface of a birefringence functional layer, the alignment or the characteristics of the birefringence functional layer are disturbed.

A second one of the post-processes that disturb the alignment or characteristics of the birefringence functional layer is, for example, a process of heating at a high temperature when another layer is formed on the birefringence functional layer (heat treatment process). Specifically, it has been confirmed that in a process of forming the polyimide film on the birefringence functional layer or in a process of forming a coloring layer on the birefringence functional layer, the alignment or the characteristics of the birefringence functional layer are disturbed after the heat treatment is applied at 200° C. or more.

The mechanism by which the solvent treatment process or the heat treatment process disturbs the alignment or the characteristics of the birefringence functional layer is not clear. However, it has been assumed that, among polymerizable liquid crystal materials that constitute a birefringence functional layer, a polymerizable liquid crystal material having non-reacted terminal double bonds is involved. The inventor, after studying hard, has found that when the degree of reduction of residual double bonds of the birefringence functional layer in the optical element formed was less than 0.25, even the post-processes do not disturb the alignment or the characteristics of the birefringence functional layer.

Hereinbelow, a method of measuring the degree of reduction of residual double bonds will be described in detail.

In the beginning, with the optical element formed as mentioned above, a Fourier Transform Infrared Spectrometer (trade name: FT/IR-610, produced by JASCO Corporation) is used to carry out measurement according to a FT-IR ATR (Attenuated Total Reflectance) method to thereby detect an infrared spectrum of a birefringence functional layer in the optical element. TGS is used as a detector, and an experiment is carried out under room temperature. Among obtained infrared spectra, a value (initial P1/initial P2) obtained by dividing an IR peak area (initial P1) of vinyl groups found around 810 $cm^{-1}$ by an IR peak area (initial P2) of carbonyl groups found around 1725 $cm^{-1}$ is taken as an amount of initial residual double bonds.

Then, the optical element is located in an oven set at 250° C. in advance to be subjected to heat treatment in this state for 1 hr. After the heat treatment, the optical element is taken out of the oven and left to room temperature, followed by once more measuring an infrared spectrum of the optical element according to the above-mentioned method. A value (post-heat treatment P1/post-heat treatment P2) obtained by dividing an IR peak area (post-heat treatment P1) of vinyl groups found around 810 $cm^{-1}$ by an IR peak area (post-heat treatment P2) of carbonyl groups found around 1725 $cm^{-1}$ is taken as an amount of after heat treatment residual double bonds. A value calculated by a calculation formula below is taken as a degree of reduction of residual double bonds.

Degree of reduction of residual double bonds=
(amount of initial residual double bonds−amount of post-heat treatment residual double bonds)/
amount of initial residual double bonds={(initial P1/initial P2)−(post-heat treatment P1/post-heat treatment P2)}/(initial P1/initial P2)    (Formula 1)

The degree of reduction of residual double bonds can be measured as it is not only in a mode where a birefringence functional layer is located on the outermost surface of the optical element but also in a case where another layer is further formed on the birefringence functional layer. Alternatively, after another layer formed on a birefringence functional layer is scraped off to expose the birefringence functional layer on the outermost surface, the degree of reduction of residual double bonds can be measured.

The degree of reduction of residual double bonds in this invention is less than 0.25, preferably less than 0.20, and more preferably less than 0.15. The degree of reduction of residual double bonds is better to be smaller from the viewpoint of favorably maintaining the alignment or the characteristics of the birefringence functional layer even in the post-processes as mentioned above. However, when the degree of reduction of residual double bonds is tried to render zero or infinitely approach zero, the conditions for forming a birefringence functional layer become severe and, as a result, in some cases, it causes inconveniences such as yellowing the birefringence functional layer. Accordingly, when considering the situations as a whole, the degree of reduction of residual double bonds is preferred to be 0.01 or more.

As mentioned above, amounts of residual double bonds of a birefringence functional layer are measured before and after the heat treatment, a difference therebetween is calculated, one of which degree of reduction of residual double bonds is less than 0.25 is selected, whereby an optical element satisfying the gist of the invention can be obtained.

In other words, an optical element that satisfies the gist of the invention can be readily obtained according to a method of producing an optical element, including the steps of: aligning and fixing polymerizable liquid crystal monomers having a polymerizable group at least one terminal thereof directly or indirectly on the substrate to form the birefringence functional layer, thereby obtaining an optical element; measuring an amount of residual double bonds of the birefringence functional layer; heating at 250° C. for 1 hr and leaving the optical element to room temperature; measuring an amount of residual double bonds of the birefringence functional layer after the heat treatment; calculating a difference between the amounts of residual double bonds measured before and after the heat treatment by the Formula 1; and selecting one of which difference of the amounts of residual double bonds is less than 0.25.

In a method of producing an optical element of the invention, which includes a selection step where the degree of reduction of residual double bonds is used as an index, another constituent layer such as a coloring layer can be further arranged between a substrate and a birefringence functional layer or further on a top surface of the birefringence functional layer.

The calculation of an amount of residual double bonds can be used also as a method of evaluating a birefringence functional layer. That is, a method of evaluating a birefringence functional layer of the invention enables to evaluate the crosslinking density of a birefringence functional layer even in a case where a kind of polymerizable liquid crystal monomer that constitutes the birefringence functional layer cannot be identified and a theoretical value and a measurement of the crosslinking density cannot be compared with each other. Accordingly, the above-described method that obtains the degree of reduction of amount of residual double bonds is very excellent as a method of evaluating a birefringence functional layer in an optical element. Even when a polymerizable liquid crystal monomer used to constitute the birefringence functional layer cannot be identified, the evaluation method can evaluate an excellent birefringence functional layer that is not substantially influenced even in the above-mentioned post-processes, by providing an optical element.

In order to obtain a birefringence functional layer of which degree of reduction of residual double bonds is less than 0.25, it is conventionally known that, for example, in a process of forming a birefringence functional layer, an exposure amount is increased when light such as UV ray is illuminated to polymerize polymerizable liquid crystal monomers. Furthermore, the inventor has obtained a finding that in an exposure amount expressed by a product of illuminance and time such as shown below, an amount of residual double bonds tends to be smaller when the illuminance is made stronger rather than the increase in the irradiation time. Specifically, in the relationship that exposure amount $(mJ/cm^2)$=illuminance $(mW/cm^2)$×time (s), the exposure amount is preferably $100\,mJ/cm^2$ or more and the illuminance at that time preferably exceeds $10\,mW/cm^2$.

According to the method where the illuminance is made stronger as mentioned above, a polymerization reaction between polymerizing monomers can be more excellently advanced than under conditions of light illumination of exposure amount same as before. This results in reduction of an amount of residual double bonds of the polymerizable liquid crystal monomers in the birefringence functional layer, and consequently, it is indicated that a polymerization reaction is difficult to proceed further even in a post-process such as heat treatment.

Still furthermore, the inventor has obtained the following finding. When a temperature is slowly elevated or lowered in the heat treatment that follows the light illumination to the liquid crystal coating film, a birefringence functional layer of which degree of reduction of residual double bonds is less than 0.25 can be favorably formed. Specifically, in all processes where a temperature is elevated or lowered, a temperature variation during 1 min is preferably 10° C. or more and 20° C. or less, and more preferably 1° C. or more and 10° C. or less.

The heat treatment can be specifically applied in such a manner that a base material having formed thereon a liquid crystal coating film for forming a birefringence functional layer is located in a baking device such as an oven device, followed by baking under the conditions of atmospheric pressure and air atmosphere. Besides, the heat treatment can be applied according to a method that employs infrared illumination or an oil bath.

However, in the invention, the method of forming an optical element provided with a birefringence functional layer of which degree of reduction of residual double bonds is less than 0.25 is not restricted to the methods exemplified above.

Figure 2:
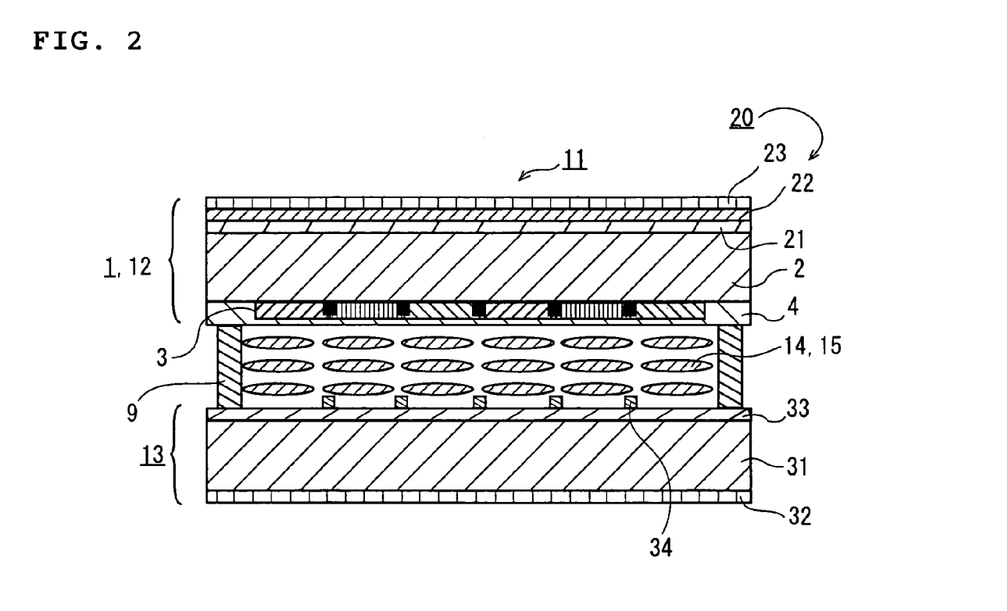
FIG. 2 is a schematic longitudinal sectional view for explaining one embodiment of a liquid crystal display device that uses a liquid crystal display device member in the invention.

The optical element 1 of the invention can be used, as shown in FIG. 2, as a display side substrate 12 arranged on an observer side (an upper side in the drawing) of a liquid crystal display device 11. The liquid crystal display device 11 is formed as follows. A driving liquid crystal material 14 is encapsulated between the display side substrate 12 and a driving circuit side substrate 13 that is a driving liquid crystal side substrate, which face each other, to form a driving liquid crystal layer, thereby obtaining a liquid crystal display device member 15. Then, linear polarization plates 23 and 32 and the like are appropriately provided to the liquid crystal display device member 15. The optical element 1 can be used as the display side substrate 12 in the liquid crystal display device 11 thus formed. In the case of an example of FIG. 2, a birefringence functional layer 4 of the optical element 1 constitutes a positive C-plate where polymerizable liquid crystal monomers are homeotropically aligned and fixed to a light transmitting substrate 2.

The driving circuit side substrate 13 is provided with a driving circuit 33 and a driving electrode 34 by which a load of voltage is controlled on an in-cell side (a side where a driving liquid crystal material 14 is encapsulated) of a transparent substrate 31.

When the liquid crystal display device 11 is an IPS mode, the linear polarization plate 23 on the side of the display side substrate 12 and the linear polarization plate 32 on the side of the driving circuit side substrate 13 are arranged so that transmission axes may be orthogonal to each other.

Though not shown in the drawing, as needs arise, a transparent conductive film 21, a retardation film 20 such as a positive A-plate 22, or a negative C-plate may be interposed in the liquid crystal display device 11 so as to be sandwiched between the display side substrate 12 and the linear polarization plate 23.

According to the optical element 1 of the invention, a birefringence functional layer 4 may be disposed inside of a liquid crystal cell so as to be sandwiched between the light transmitting substrate 2 and the transparent substrate 31 that constitutes the driving circuit side substrate 13 in the optical element, whereby a liquid crystal display device provided with a so-called in-cell type birefringence functional layer 4 can be formed.

EXAMPLES

Example 1

A mixture of compounds (a) to (d) shown by [Chem 5] below as a polymerizable liquid crystal monomer, BHT (2,6-di-tert-butyl-4-hydroxytoluene) as a polymerization inhibitor, Irgacure 907 (trade name) as a polymerization initiator and dodecanol as an additive were mixed to prepare a birefringence functional layer composition solution having the following composition. The birefringence functional layer composition solution was prepared according to a description of JP-A-2004-524385. Weight ratios of the respective substances in composition A shown below are weight ratios of the respective substances to a total weight of the composition A.

[Chem 5]

(a)

(b)

(c)

-continued (d)

<Composition A>
Compound (a) 32.67% by weight
Compound (b) 18.67% by weight
Compound (c) 21.00% by weight
Compound (d) 21.00% by weight
Dodecanol 1.02% by weight
BHT 0.04% by weight
Irgacure 907 5.60% by weight The composition A was dissolved in propylene glycol monomethyl ether acetate (PGMEA) to prepare a birefringence functional layer composition solution at a concentration of 20% by weight.

Next, a glass substrate (model #1737 glass, thickness: 0.7 mm, produced by Corning Corp.) was set to a spin coater (trade name: 1H-360H, produced by Mikasa K. K.) and the birefringence functional layer composition solution prepared in advance was spin coated on the glass substrate so that a dry film thickness was about 1.5 μM. In the example, a spin coating method was adopted as the method of coating a birefringence functional layer composition solution. However, the method of coating a birefringence functional layer composition solution on a base material surface is not restricted thereto. For example, a die-coating method, a slit coating method or a combination thereof can be appropriately selected. This is same in examples described below. Then, a substrate coated with the birefringence functional layer composition solution was heated on a hot plate at 100° C. for 3 min to thereby remove a residual solvent, and liquid crystal monomers contained in the birefringence functional layer composition solution were aligned in a direction vertical to the substrate surface. A liquid crystal transition point where the film formed from the birefringence functional layer composition solution became transparent from white color was visually confirmed, resulting in finding that liquid crystal molecules were vertically aligned.

Subsequently, under an air atmospheric environment, UV-ray of 20 mW/cm² was illuminated for 10 sec from a UV illuminator (trade name: TOSCURE 751, produced by Toshiba-Harrison Lighting Co., Ltd.) having a ultra-high pressure mercury lamp to crosslinking polymerize liquid crystal monomers constituting a liquid crystal layer, whereby a base material including a birefringence functional layer was formed.

Thereafter, the base material was baked at 180° C. for 1 hr to produce an optical element of the invention as Example 1.

(Evaluation 1)

A color of the surface of the birefringence functional layer in the optical element of Example 1 was visually observed. One that did not show color change was evaluated as "◯ (good)" and one that showed color change was evaluated as "X (bad)". The results obtained are shown in Table 1.

(Evaluation 2)

In order to evaluate whether the birefringence functional layer of Example 1 can endure the post-process or not, a γ-butylolactone dip test was carried out as follows with solvent corrosion in the post-process assumed. In addition, the γ-butylolactone dip test was done assuming solvent corrosion in the post-process.

In the γ-butylolactone dip test, γ-butylolactone (produced by Junsei Chemical Co., Ltd.) was heated in advance to 40° C. being an experimental temperature, and then the optical element of Example 1 prepared as mentioned above was dipped in the γ-butylolactone for 40 min so that an entirety thereof was immersed. Thereafter, the optical element was taken out of the γ-butylolactone, and dried by blowing air, followed by visually observing using an alley light whether there was peeling or not. One that was not confirmed of the peeling was evaluated as "◯ (good)" and one that was confirmed of the peeling was evaluated as "X (bad)".

(Evaluation 3)

The degree of reduction of residual double bonds of the birefringence functional layer in Example 1 was calculated according to the method mentioned above. The results obtained are shown in Table 1.

Example 2

In Example 2, an optical element provided with a birefringence functional layer was produced in the same manner as in Example 1, except that the baking treatment to the base material was changed from 180° C. for 1 hr to 200° C. for 1 hr. As for Example 2, Evaluations 1 to 3 were carried out similarly to Example 1. The results obtained are shown in Table 1.

Example 3

In Example 3, an optical element provided with a birefringence functional layer was produced in the same manner as in Example 1, except that the baking treatment to the base material was changed from 180° C. for 1 hr to 230° C. for 1 hr. As for Example 3, Evaluations 1 to 3 were carried out similarly to Example 1. The results obtained are shown in Table 1.

Example 4

In Example 4, an optical element provided with a birefringence functional layer was produced in the same manner as in Example 1, except that the baking treatment to the base material was changed from 180° C. for 1 hr to 250° C. for 1 hr. As for Example 4, Evaluations 1 to 3 were carried out similarly to Example 1. The results obtained are shown in Table 1.

Example 5

A coloring layer was formed on a top surface of the glass substrate used in Example 1 according to a method described below, and a birefringence functional layer was formed on a top surface of the coloring layer according to a method similar to Example 2 to thereby produce an optical element as Example 5. Pigment dispersion type photoresists were used as coloring materials of black matrix and the respective pixel portions of red color (R), green color (G) and blue color (B).

The pigment dispersion type photoresist was prepared in such a manner that, with a pigment as a coloring material beads were added to a dispersion solution composition containing a pigment, a dispersion agent and a solvent, and the mixture was dispersed for 3 hr by use of a disperser, further followed mixing the dispersion solution with beads removed therefrom and a clear resist composition (containing polymer, monomer, additive, initiator and solvent). The composition is shown below. The disperser was a paint shaker.

In order to form the coloring layer, the BM photoresist above prepared was first coated on a top surface of a glass substrate at a thickness of 1.2 µm by a spin coating method, and pre-baked at 80° C. for 3 min to be exposed with a mask formed into a predetermined pattern (100 mJ/cm$^2$). Then, development was performed by spraying a 0.05% KOH aqueous solution for 50 sec, followed by post-baking at 230° C. for 30 min, to thereby prepare a BM substrate.

Next, a red (R) pigment dispersion type photoresist was spin coated on the black matrix substrate, and pre-baked at 80° C. for 5 min to perform alignment exposure (300 mJ/cm$^2$) with a predetermined colored pattern photomask. Then, development was performed by spraying a 0.1% KOH aqueous solution for 60 sec, followed by post-baking at 200° C. for 60 min, to thereby form a red (R) pixel pattern having a film thickness of 2.6 µm at a predetermined position with respect to the black matrix pattern.

Similarly, a green (G) pigment dispersion type photoresist was used to form a green (G) pixel pattern having a film thickness of 2.6 µm at a predetermined position with respect to the black matrix pattern.

Furthermore, a blue (B) pigment dispersion type photoresist was used to form a blue (B) pixel pattern having a film thickness of 2.6 µm at a predetermined position with respect to the black matrix pattern.

Black Matrix Photoresist
  Black pigment (trade name: TM Black #9550, produced by Dainichiseika Color & Chemicals Mfg. Co., Ltd.) 14.0 parts by weight
  Dispersant (trade name: Disperbyk 111, produced by Byk Chemie) 1.2 parts by weight
  Polymer (trade name: VR60, produced by Showa High-polymer K. K.) 2.8 parts by weight
  Monomer (trade name: SR399, produced by Sartomer Chemical) 3.5 parts by weight
  Additive (trade name: L-20, produced by Soken Chemical & Engineering Co., Ltd.) 0.7 parts by weight
  Initiator (2-benzyl-2-dimethylamino-1-(4-morphorinophenyl)-butanone-1) 1.6 parts by weight
  Initiator (4,4'-diethylaminobenzophenone) 0.3 parts by weight
  Initiator (2,4-diethylthioxanthone) 0.1 parts by weight
  Solvent (ethylene glycol monobutyl ether) 75.8 parts by weight
Red (R) Pixel Resist
  Red pigment (C. I. PR254 (Chromophthal DPP Red BP, produced by Ciba Specialty Chemicals Co., Ltd.)) 3.5 parts by weight
  Yellow pigment (C. I. PY139 (Paliotol Yellow D1819, produced by BASF Co., Ltd.)) 0.6 parts by weight
  Dispersant (trade name: Solsperse 24000, produced by Zeneca Co., Ltd.) 3.0 parts by weight
  Monomer (trade name: SR399, produced by Sartomer Co., Ltd.) 4.0 parts by weight
  Polymer 1 5.0 parts by weight
  Initiator (trade name: Irgacure 907, produced by Ciba Specialty Chemicals Co., Ltd.) 1.4 parts by weight
  Initiator (2,2'-bis(o-chlorophenyl)-4,5,4',5'-tetraphenyl-1,2'-biimidazol e) 0.6 parts by weight
  Solvent (propylene glycol monomethyl ether acetate) 81.9 parts by weight
Green (G) Pixel Resist
  Green pigment (C. I. PG7 (Fast Green 5316P, produced by Dainichiseika Color & Chemicals Mfg. Co., Ltd.)) 3.7 parts by weight.
  Yellow pigment (C. I. PY139 (Paliotol Yellow D1819, produced by BASF Co., Ltd.)) 2.3 parts by weight
  Dispersant (trade name: Solsperse 24000, produced by Zeneca Co., Ltd.) 3.0 parts by weight
  Monomer (trade name: SR399, produced by Sartomer Co., Ltd.) 4.0 parts by weight
  Polymer 1 5.0 parts by weight
  Initiator (trade name: Irgacure 907, produced by Ciba Specialty Chemicals Co., Ltd.) 1.4 parts by weight
  Initiator (2,2'-bis(o-chlorophenyl)-4,5,4',5'-tetraphenyl-1,2'-biimidazol e) 0.6 parts by weight
  Solvent (propylene glycol monomethyl ether acetate) 80.0 parts by weight
Blue (B) Pixel Resist
  Blue pigment (C. I. PB15:6 (Heliogen Blue L6700F, produced by BASF)) 4.6 parts by weight
  Violet pigment (C. I. PV23 (Hostaperm RL-NF, produced by Clarient)) 1.4 parts by weight
  Pigment Derivative (trade name: Solsperse 12000, produced by Zeneca Co., Ltd.) 0.6 parts by weight
  Dispersant (trade name: Solsperse 24000, produced by Zeneca Co., Ltd.) 2.4 parts by weight
  Monomer (trade name: SR399, produced by Sartomer Co., Ltd.) 4.0 parts by weight.
  Polymer 1 5.0 parts by weight
  Initiator (trade name: Irgacure 907, produced by Ciba Specialty Chemicals Co., Ltd.) 1.4 parts by weight
  Initiator (2,2'-bis(o-chlorophenyl)-4,5,4',5'-tetraphenyl-1,2'-biimidazol e) 0.6 parts by weight
  Solvent (propylene glycol monomethyl ether acetate) 80.0 parts by weight The polymer 1 was obtained by adding 16.9 mol % of 2-methacryloyloxy ethyl isocyanate to 100 mol % of a copolymer of benzyl methacrylate: styrene: acrylic acid: 2-hydroxyethyl methacrylate=15.6: 37.0: 30.5: 16.9 (molar ratio) and had a weight average molecular weight of 42500.

As for Example 5, Evaluations 1 to 3 were carried out similarly to Example 1. The results obtained are shown in Table 1.

Comparative Example 1

In Comparative Example 1, an optical element provided with a birefringence functional layer was produced in the same manner as in Example 1, except that the baking treatment was not applied to the base material. As for Comparative Example 1, Evaluations 1 to 3 were carried out similarly to Example 1. The results obtained are shown in Table 1.

Comparative Example 2

In Comparative Example 2, an optical element provided with a birefringence functional layer was produced in the same manner as in Example 1, except that the baking treatment to the base material was changed from 180° C. for 1 hr to 150° C. for 1 hr. As for Comparative Example 2, Evaluations 1 to 3 were carried out similarly to Example 1. The results obtained are shown in Table 1.

Reference Example 1

In Reference Example 1, an optical element provided with a birefringence functional layer was produced in the same manner as in Example 1, except that the baking treatment to the base material was changed from 180° C. for 1 hr to 280° C. for 1 hr. As for Reference Example 1, Evaluations 1 to 3 were carried out similarly to Example 1. The results obtained are shown in Table 1.

As clear from the results shown in Table 1, the degrees of reduction of residual double bonds in Examples 1 to 5 were all less than 0.25 and the results of both of Evaluations 1 and 2 were excellent. In Comparative Examples 1 and 2, on the other hand, the degrees of reduction of residual double bonds were 0.25 or more and it was shown in Evaluation 2 that the characteristics of birefringence functional layers became poor in a post-process. In Reference Example 1, although the degree of reduction of residual double bonds was zero, the production conditions were severe and the evaluation of color of the optical element (Evaluation 1) was not favorable.

TABLE 1

| | Sample Preparation Conditions | | Evaluation Results | |
|---|---|---|---|---|
| | Base Material | Baking Temperature (° C.) | Evaluation 1 (Color) | Evaluation 2 (Peeling) | Evaluation 3 (Degree of Reduction of Residual Double Bonds) |
| Example 1 | Glass | 180 | ○ | ○ | 0.23 |
| Example 2 | Glass | 200 | ○ | ○ | 0.16 |
| Example 3 | Glass | 230 | ○ | ○ | 0.13 |
| Example 4 | Glass | 250 | ○ | ○ | 0.03 |
| Example 5 | Color Filter | 200 | ○ | ○ | 0.15 |
| Comparative Example 1 | Glass | — | ○ | × | 0.34 |
| Comparative Example 2 | Glass | 150 | ○ | × | 0.27 |
| Reference Example 1 | Glass | 280 | × | ○ | 0 |

What is claimed is:

1. An optical element comprising:
   a light-transmitting substrate;
   a birefringence functional layer made of a polymerizable liquid crystal material provided above the light-transmitting substrate;
   a coloring layer provided between the light-transmitting substrate and the birefringence functional layer, directly or indirectly on a surface of the birefringence functional layer; and
   an alignment film for aligning a driving liquid crystal material provided directly or indirectly on a surface of the birefringence functional layer,
   whereby the birefringence functional layer is formed by aligning a polymerizable liquid crystal monomer having a polymerizable group at least at one terminal followed by fixation, and a degree of reduction of residual double bond in the birefringence functional layer before and after heat treatment at 250° C. for 1 hr is less than 0.25.

2. The optical element according to claim 1, wherein the birefringence functional layer is formed by forming a coating film by coating a birefringence functional layer composition solution containing a polymerizable liquid crystal monomer directly or indirectly on a top surface of the substrate, and then aligning the polymerizable liquid crystal monomer in a desired direction, followed by irradiating a top surface of the coating film with light to cause a polymerization reaction between the polymerizable liquid crystal monomers.

3. The optical element according to claim 2, wherein the birefringence functional layer is formed by polymerizing and fixing the polymerizable liquid crystal monomers in a homeotropically aligned state.

4. The optical element according to claim 1, wherein the coloring layer is formed on the substrate and the birefringence functional layer is formed on the coloring layer, and the alignment film for aligning a driving liquid crystal material is directly or indirectly formed further on the surface of the birefringence functional layer.

5. The optical element according to claim 2, wherein the coloring layer is formed on the substrate and the birefringence functional layer is formed on the coloring layer, and the alignment film for aligning a driving liquid crystal material is directly or indirectly formed further on the surface of the birefringence functional layer.

6. A liquid crystal display device member, comprising a liquid crystal layer in which a driving liquid crystal material is encapsulated between two laminate structures provided with a light-transmitting substrate,
   wherein the optical element of claim 1 is used as one of the two laminate structures.

7. A liquid crystal display device member, comprising a liquid crystal layer in which a driving liquid crystal material is encapsulated between two laminate structures provided with a light-transmitting substrate,
   wherein the optical element of claim 2 is used as one of the two laminate structures.

8. A liquid crystal display device member, comprising a liquid crystal layer in which a driving liquid crystal material is encapsulated between two laminate structures provided with a light-transmitting substrate,
   wherein the optical element of claim 1 is used as one of the two laminate structures.

9. A liquid crystal display device member, comprising a liquid crystal layer in which a driving liquid crystal material is encapsulated between two laminate structures provided with a light-transmitting substrate,
   wherein the optical element of claim 1 is used as one of the two laminate structures.

10. The liquid crystal display device member according to claim 6, wherein a birefringence functional layer in the optical element is located on a liquid crystal layer side in the liquid crystal display device member.

11. A multi-layer liquid crystal display device, comprising:
    a polarization plate outside of both substrates that sandwich the liquid crystal layer; and
    a layer composed of an electrode member that applies a voltage to vary alignment of a liquid crystal layer,
    wherein the liquid crystal display device member of claim 6 is used.

12. A multi-layer liquid crystal display device, comprising:
    a polarization plate outside of both substrates that sandwich the liquid crystal layer; and
    a layer composed of an electrode member that applies a voltage to vary alignment of a liquid crystal layer,
    wherein the liquid crystal display device member of claim 8 is used.

13. A multi-layer liquid crystal display device, comprising:
a polarization plate outside of both substrates that sandwich the liquid crystal layer; and
a layer composed of an electrode member that applies a voltage to vary alignment of a liquid crystal layer,
wherein the liquid crystal display device member of claim 9 is used.

14. An optical element comprising:
a light-transmitting substrate;
a birefringence functional layer made of a polymerizable liquid crystal material which is formed by a polymerizable liquid crystal monomer aligned in a predetermined direction and fixed thereafter, and the birefringence functional layer being provided above the light-transmitting substrate;
a coloring layer disposed between the light-transmitting substrate and the birefringence functional layer; and
an alignment film provided directly or indirectly on a surface of the birefringence functional layer in order to align a driving liquid crystal material; whereby a degree of reduction of residual double bond in the birefringence functional layer before and after the heat treatment at 250° C. for 1 hr is less than 0.25.

* * * * *